US011126722B1

(12) United States Patent
Ding et al.

(10) Patent No.: US 11,126,722 B1
(45) Date of Patent: Sep. 21, 2021

(54) REPLACEMENT OF E-MAIL ATTACHMENT WITH URL

(71) Applicants: Ritchied Ding, Nanjing (CN); Rocky Qu, Nanjing (CN); Richard Li, Nanjing (CN)

(72) Inventors: Ritchied Ding, Nanjing (CN); Rocky Qu, Nanjing (CN); Richard Li, Nanjing (CN)

(73) Assignee: TREND MICRO INC., Tokyo (JP)

( * ) Notice: Subject to any disclaimer, the term of this patent is extended or adjusted under 35 U.S.C. 154(b) by 397 days.

(21) Appl. No.: 16/265,328

(22) Filed: Feb. 1, 2019

(51) Int. Cl.
*G06F 21/56* (2013.01)
*G06F 16/955* (2019.01)
*H04L 12/58* (2006.01)

(52) U.S. Cl.
CPC .......... *G06F 21/566* (2013.01); *G06F 16/955* (2019.01); *G06F 21/564* (2013.01); *H04L 51/08* (2013.01)

(58) Field of Classification Search
CPC .... G06F 21/566; G06F 16/955; G06F 21/564; H04L 51/08
See application file for complete search history.

(56) References Cited

U.S. PATENT DOCUMENTS

| | | | | |
|---|---|---|---|---|
| 7,099,853 B1* | 8/2006 | Liu | ........................ | G06F 21/564 706/14 |
| 8,458,797 B1* | 6/2013 | Yu | .......................... | G06F 21/566 726/24 |
| 2004/0064734 A1* | 4/2004 | Ehrlich | ................... | H04L 51/12 726/30 |
| 2017/0063765 A1* | 3/2017 | Herger | .................... | H04L 51/08 |

* cited by examiner

*Primary Examiner* — Arvin Eskandarnia
(74) *Attorney, Agent, or Firm* — Beyer Law Group LLP

(57) ABSTRACT

An attachment to an e-mail message is replaced with a URL before that message is delivered to an end user, thus providing more time to perform a better scan at a cloud server computer. The attachment is removed from the e-mail message and sent to the cloud server computer for a dynamic scan and a static scan which will likely include updates better able to detect malicious software. The e-mail message with the URL is delivered to the end user and there is a delay before the end user reads the message or attempts to open the attachment. An artificial delay may be introduced at an e-mail gateway before the message is delivered to the end-user. If the attachment is benign then the end user is allowed to download it via the URL; if the attachment is malicious then the end user is only given a warning message.

26 Claims, 7 Drawing Sheets

System

System

E-mail Message with Attachment

E-mail Message with URL

Alert Message From Cloud Server

REPLACEMENT OF E-MAIL ATTACHMENT WITH URL

FIELD OF THE INVENTION

The present invention relates generally to detection of malicious software. More specifically, the present invention relates to replacing the attachment of an e-mail message with a URL in order to perform better scanning.

BACKGROUND OF THE INVENTION

For many years, incoming e-mail messages into an enterprise have been the vehicle by which attackers have delivered Advanced Persistent Threats (APT). Typically, the malicious e-mail message allows the attacker to deliver and insert malware into the enterprise's network or onto an end user's computer. The malware thus inserted is able to probe for additional network access or vulnerabilities, communicate with a malicious command and control server (C&C), gather target data from users, and eventually exfiltrate the data off of the enterprise network. In particular, attackers deliver such a threat through a malicious attachment to the e-mail message. Unfortunately, such a malicious attachment can often bypass current antivirus security measures by taking advantage of so-called "zero-day" vulnerabilities, etc. In other words, there is often a delay between a new attack and the virus pattern update meant to detect that new attack. Thus, a new attack in an attachment may seem benign when it is initially scanned upon receipt at an e-mail gateway because a specific virus signature to detect that attack has not been developed yet. By the time a virus signature is developed to detect that particular attack and a virus pattern file is updated, it may be too late as the message and its attachment has already been delivered to the end user.

In the meantime, attackers continue to deliver threats via malicious e-mail messages and attachments. A technique and system that would allow end users and enterprises to detect malicious attachments in e-mail messages is desired.

SUMMARY OF THE INVENTION

To achieve the foregoing, and in accordance with the purpose of the present invention, a system is disclosed that replaces an attachment to an e-mail message with a URL from which an end user may download the attachment at a later time.

The invention is able to take advantage of the fact that an end user may not immediately read an e-mail message and open its attachment upon receiving the message. For zero-day malware, it is possible that the initial, local scan at an e-mail gateway will not detect a malicious attachment before the message is delivered to the end-user. Often there is a delay of a day or two before the user clicks upon the attachment in order to open it, even if he or she had read the message as soon as it is received. During this delay, it is possible that a virus pattern can be updated with a new virus signature matching potential malware in the attachment, or that new behavior rules can be added to dynamic scan software to detect the potential malware. Even a delay of a day or less can be significant. For example, an e-mail message received late in the day may not be read (or its attachment not opened) until the morning of the next day or even later. That amount of time may be all that is necessary for antivirus researchers to discover a virus signature or new behavior rules to detect a malicious attachment. Once a virus pattern is updated with the new virus signature or behavior rules are updated with new behavior rules, an additional static or dynamic scan on a cloud server computer may be performed to detect a malicious attachment.

Additionally, scanning performed on a cloud server computer may be a better scan than that performed locally at an e-mail gateway computer. For one, a dynamic scan may be performed for a longer time on a cloud server computer than that performed locally. Often, a dynamic scan may not be performed on a gateway computer or within an enterprise because it is too time-consuming or resource intensive, or the dynamic scan may be shortened. A longer dynamic scan is better able to detect malicious software because it can capture more behavior.

Accordingly, replacing an attachment to an e-mail message with a URL before that message is delivered to an end user provides more time to perform a better scan at a cloud server computer. The attachment is removed from the e-mail message and sent to the cloud server computer for a dynamic scan and a static scan. In the meantime, the e-mail message with the URL is delivered to the end user and there is a delay before the end user reads the message or attempt to open the attachment. Optionally, an artificial delay may be introduced as an option at e-mail gateway before the message is delivered to the end-user. If the attachment is benign then the end user is allowed to download it via the URL; on the other hand, if the attachment is malicious then the end user is only given a warning message.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention replaces an attachment of an e-mail message at an e-mail gateway with a URL before the e-mail message is delivered to an end user. During a delay before the end user reads the message or attempts to open the attachment, further scanning is performed on a cloud server computer using either an updated pattern file or updated behavior rules in order to detect any potential malicious attachment.

System Diagram

Figure 1:
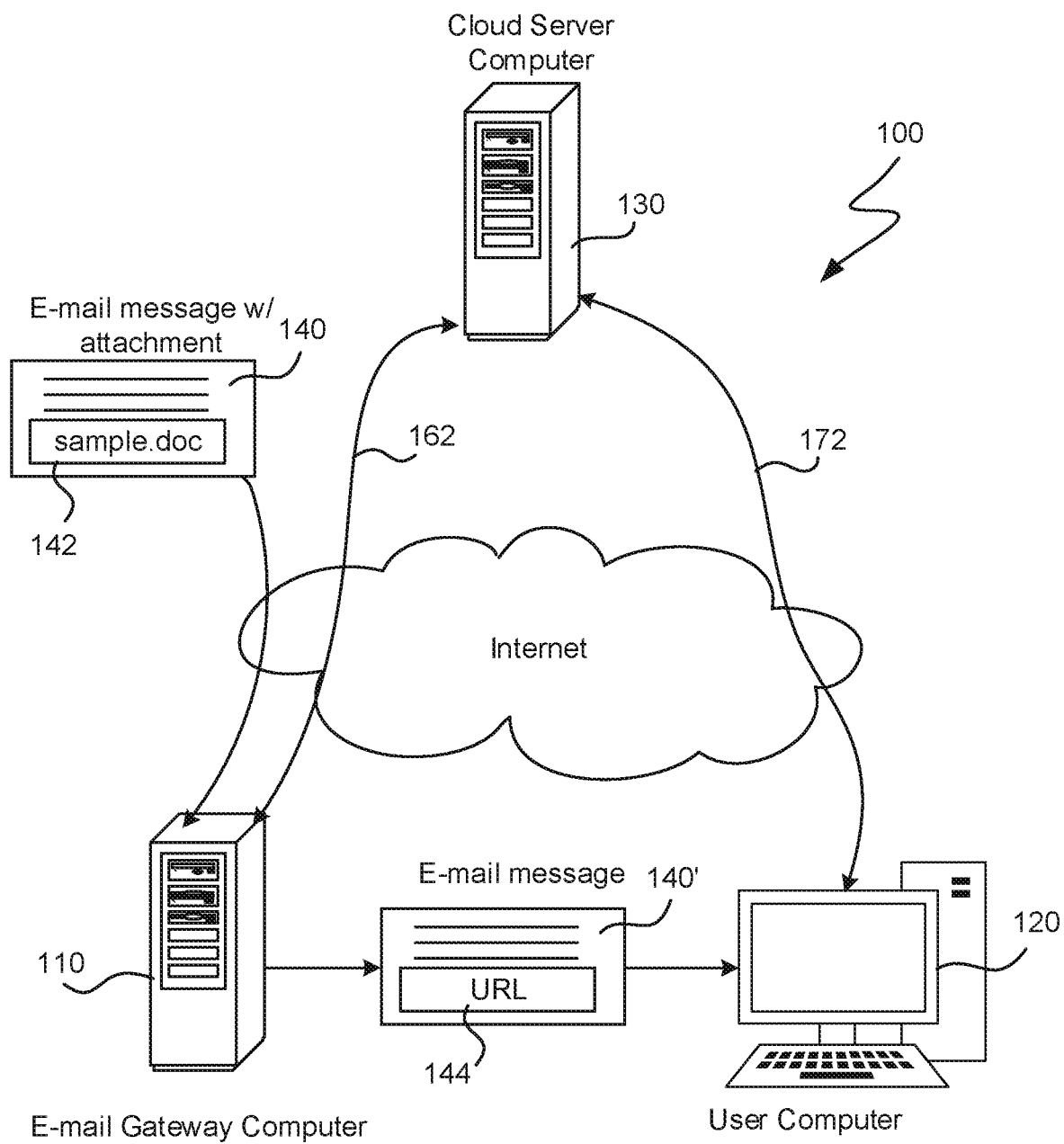
FIG. 1 is a system illustrating one embodiment of the invention.

FIG. 1 is a system 100 illustrating one embodiment of the invention. Shown are an e-mail gateway computer 110 and a user computer 120 that are typically found within an enterprise. As is known in the art, computer 110 typically receives incoming e-mail messages over the Internet from any number of sources and then routes these e-mail messages to any number of end users within the enterprise. Gateway computer 110 typically performs scanning of incoming e-mail messages in order to detect malicious software within the message itself or within the attachment.

Alternatively, some enterprises utilize a cloud service instead of having their own e-mail gateway computer on site. In this embodiment, e-mail gateway computer 110 may be a separate computer in the cloud accessible to the enterprise over an Internet connection, or, the functionality of the e-mail gateway may be embodied within server software located upon any suitable cloud server computer.

Cloud server computer 130 is any suitable computer or cluster of computers accessible over an Internet connection to an enterprise and its end-user computers, such as user computer 120. Server computer 130 may be part of a cluster of server computers operated by Trend Micro Inc., and may include any number of Hosted E-Mail Security (HES) servers or other server products available from Trend Micro. Or, server computer 130 may be network appliance hardware such as the Deep Discovery Web Inspector (DDWI) available from Trend Micro or any other computer hardware suitable for implementing the steps described below.

In addition to the public cloud options mentioned above, an enterprise may decide that privacy of their own data is important and may operate their own server computer or computers 130 within their own enterprise environment, implementing, for example, Deep Discovery Analyzer (DDAN) server software (available from Trend Micro) on a cluster of computers, again, suitable for implementing the steps described below.

Shown in FIG. 1 is an incoming e-mail message 140 having an attachment 142 "sample.doc" that has arrived from an outside source in that is destined for a user operating user computer 120. As will be explained in greater detail below, the gateway computer 110 replaces the attachment 142 with a URL 144 before delivering the e-mail message 140' to the end-user.

Flow Diagrams

Figure 2:
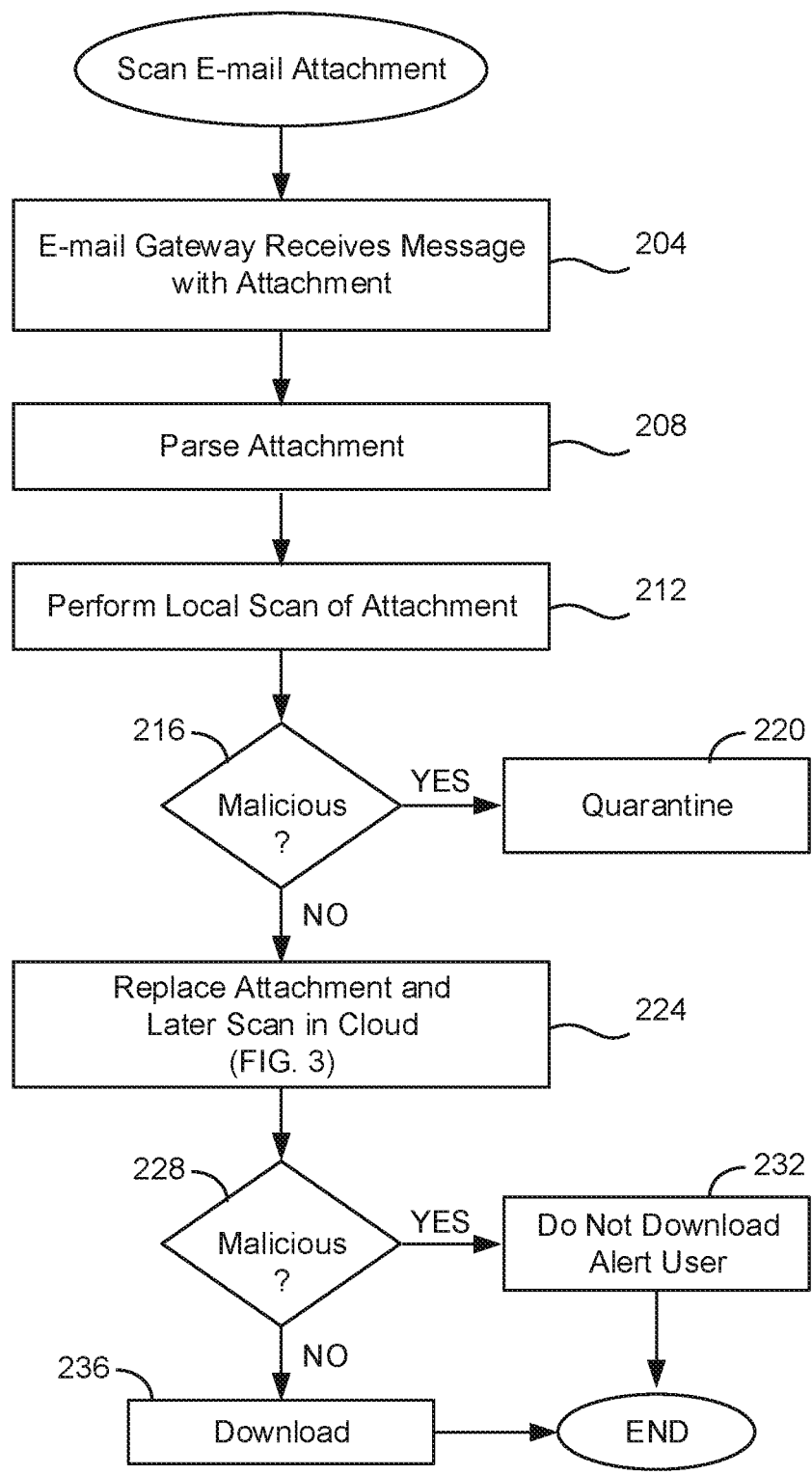
FIG. 2 is a high-level flow diagram describing one embodiment by which an attachment of an e-mail message is scanned for malicious software.
Figure 3:
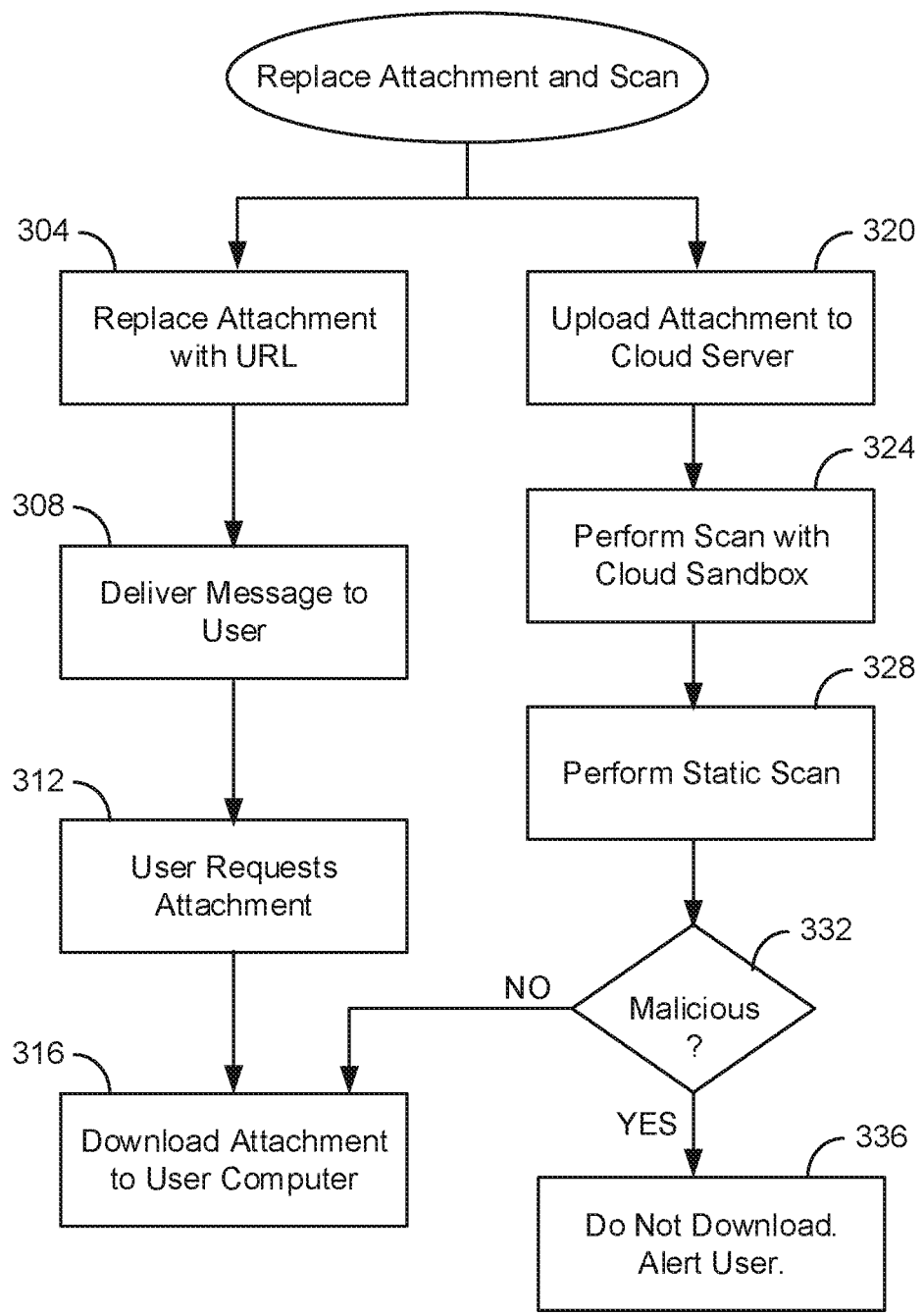
FIG. 3 describes how the attachment is replaced with a URL and how further scanning is performed at a cloud server computer.
Figure 4:
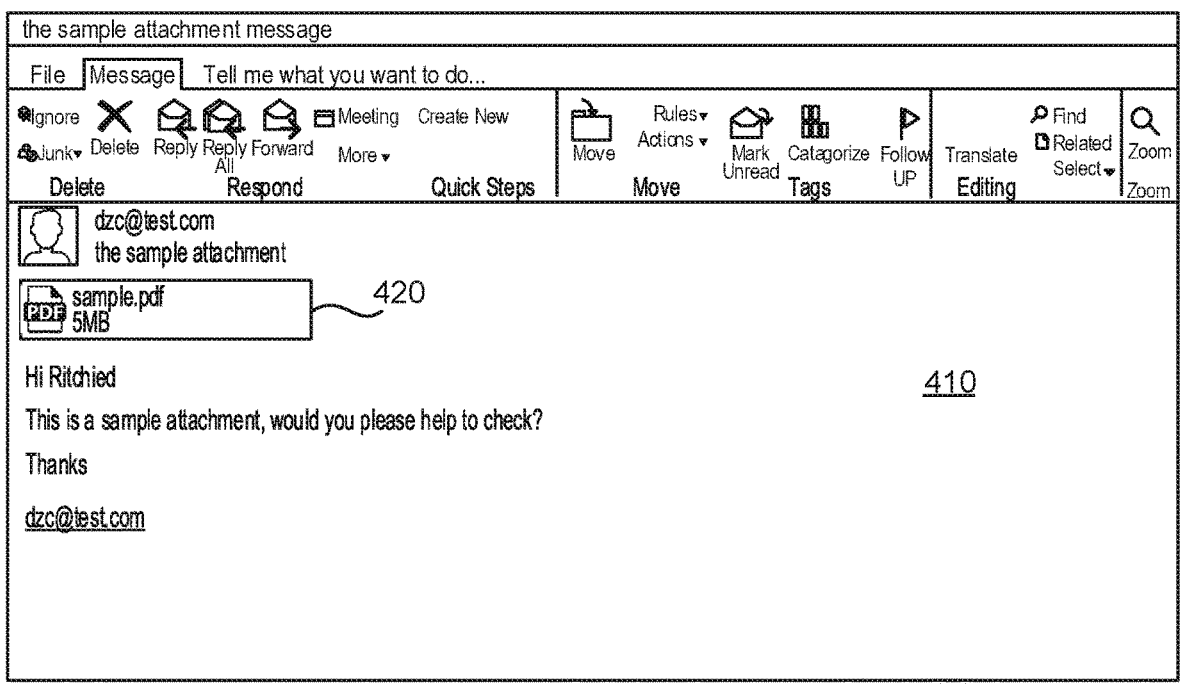
FIG. 4 illustrates an incoming e-mail message having an attachment.
Figure 5:
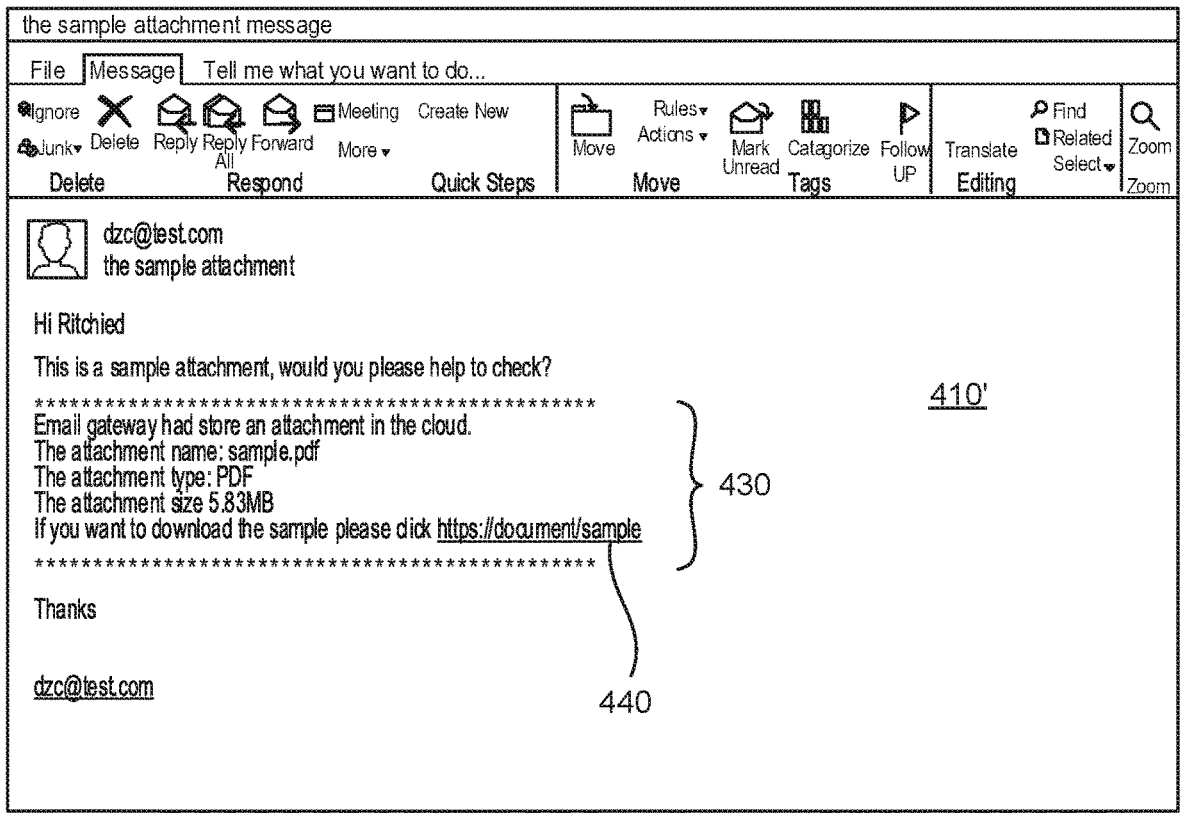
FIG. 5 illustrates the same e-mail message having a URL instead of the attachment before delivery to the end user.
Figure 6:
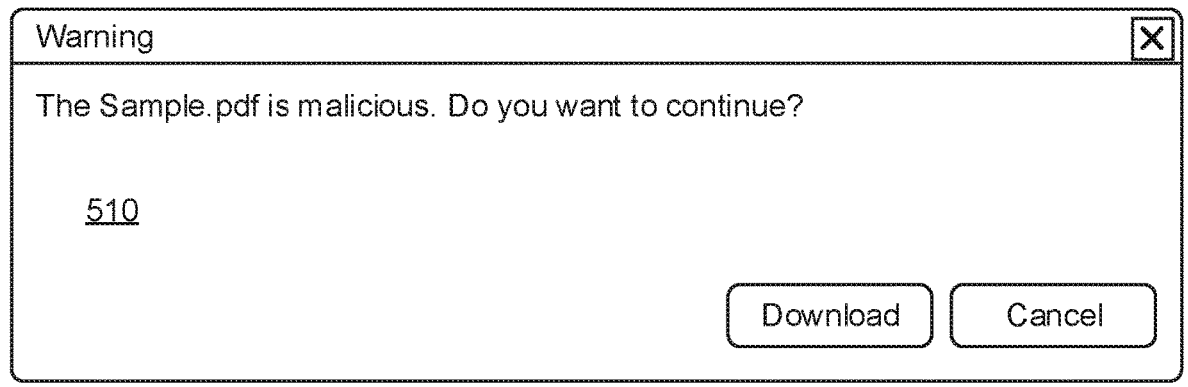
FIG. 6 illustrates an alert message delivered to the end user from a cloud server computer.

FIG. 2 is a high-level flow diagram describing one embodiment by which an attachment of an e-mail message is scanned for malicious software. FIG. 3 is a flow diagram describing how the attachment is replaced and scanned and implements step 224 of FIG. 2. FIG. 4 illustrates an incoming e-mail message having an attachment. FIG. 5 illustrates the same e-mail message having a URL instead of the attachment before delivery to the end user. FIG. 6 illustrates an alert message delivered to the end user from a cloud server computer. FIGS. 4-6 are referred to in the below discussion.

In a first step 204 an e-mail gateway 110 receives an incoming e-mail message 140 having an attachment 142. The message may come from any source and it is possible that the message comes from a bad actor or even from a known individual who has inadvertently sent or forwarded an e-mail message having a malicious attachment. Attachment 142 may be any type of file such as a PDF file, Word document, Microsoft Office document, image file, or other file types such as .exe, .jar, .js, .vbs, .rtf, .mis, flash, etc., any which are capable of being a malicious attachment. FIG. 4 illustrates an example e-mail message 410 having attachment file 420, which in this example is a PDF file. The attachment may be malicious in that it includes executable code that is malicious, it may cause execution of malicious code already on the user computer, or it may perform other malicious actions such as connecting to a C&C server, infecting others computers, etc.

In step 208 the attachment is parsed, i.e., the attachment is extracted in some fashion from the e-mail message so that it may be scanned. It is not strictly necessary to remove the attachment from the e-mail message at this point, it may simply be copied or extracted in another manner.

In step 212 the e-mail gateway computer 110 performs a scan of the attachment before the e-mail message is delivered to the end user. This scanning may include a static scan as well as a dynamic scan. A static scan is known in the art and typically involves comparing a current virus pattern (which includes any number of virus signatures) to the attachment; any match between a virus signature and the attachment indicates that the attachment is malicious. Nevertheless, it is possible that zero-day malware (or other malware) is present in the attachment and that the virus pattern does not include a virus signature that matches any malicious software in the attachment. For this reason, it is possible that a static scan of the attachment will indicate that no malicious software is found even though the attachment is actually malicious.

The scanning may also include a dynamic scan. A dynamic scan is known in the art and typically involves allowing the attachment (or any executable code within the attachment) to execute in a safe environment such as within sandbox software, an emulated operating system, a virtual machine, etc. During this execution, the behaviors of the attachment are monitored and these behaviors are compared to known malicious behaviors or rules. Any match between these malicious behaviors and behaviors of the attachment indicate that the attachment is malicious. Nevertheless, it is possible that zero-day malware (or other malware) is present in the attachment and that the current behavior rules do not match any malicious software in the attachment. For this reason, it is possible that a dynamic scan of the attachment may also indicate that no malicious software is found even though the attachment is actually malicious. Further, it is possible that an e-mail gateway computer will not run a dynamic scan of the attachment, or may run a dynamic scan that is shorter (and less effective) than a dynamic scan that can be run on a cloud server computer.

Accordingly, step 216 determines whether the attachment is malicious based upon either or both of these scans. If either scan indicates that the attachment is malicious then in step 220 appropriate action is taken such as quarantining the attachment, removing the attachment from the e-mail message, quarantining the e-mail message, delivering an alert to the end user without the e-mail message, etc. Any other hand, if neither scan indicates that the attachment is malicious then control moves to step 224. Even though the scans do not indicate that the attachment is malicious, it is possible that the attachment is malicious and the invention now operates to replace the attachment with a URL and perform further scanning.

FIG. 3 implements step 224 and describes how the attachment is replaced with a URL and how further scanning is performed at a cloud server computer. As mentioned earlier, there will be a delay between when the local scan of the attachment occurs in step 212 and when further scanning occurs on the server computer in steps 324 and 328. During this delay, it is likely that the virus pattern file used for the static scan in step 212 will be updated and will include more virus signatures, possibly capable of detecting malicious software in the attachment, and, it is likely that the behavior rules used for detecting malicious software in a dynamic scan will also be updated. Typically, behavior rules are updated as often as once a day, while virus pattern files may be updated twice a day or more frequently.

In step 304 the e-mail gateway replaces the attachment in e-mail message 140 with a URL 144 to produce e-mail message 140'. Preferably, the URL is a link to a Web site executing upon a computer which hosts not only the scanning software referred to steps 324 and 328 below, but also storage of the attachments received from the e-mail gateway computer. As will be described below, for attachments which are benign the URL allows a user to download the attachment, while for attachments which are malicious only an alert message will be provided. FIG. 5 illustrates an e-mail message 410' in which the original attachment has been replaced with the URL 440 "htpps://ddcloud/sample/". Also included is information 430 from the gateway computer indicating where the attachment has been stored, the attachment name, type and size.

At this point in time an artificial delay in the delivery of the e-mail message to the user may be introduced by the e-mail gateway, thus allowing more time for a virus pattern to be updated or for more behavior rules to be updated. The e-mail gateway software includes a configuration option allowing an administrator to set this artificial delay to be anywhere from minutes to several hours or more.

In step 308 after any artificial delay (if so configured) the e-mail message along with the URL instead of the original attachment is delivered to the end user computer. At this point in time it is likely that there will be a delay from when the message arrives in the user's electronic inbox to when the user actually reads the message or attempts to open the attachment. As mentioned above, it is possible that from the time a message arrives in a user's inbox to when a user actually attempts to open an attachment may be anywhere from a few hours, to half a day, to one day or longer.

In step 312 the user opens e-mail message 410' as shown in FIG. 5 and requests the attachment by clicking upon link 440. Before continuing with step 316, this discussion returns to how the attachment is handled upon the cloud server computer.

In step 320 the attachment 420 from the original e-mail message 410 is uploaded to the cloud server computer 130. The attachment may be uploaded as soon as the e-mail gateway receives the message with the attachment in step 204, that is, it is not necessary to wait until steps 208-216 occur, nor wait until steps 304-312 occur before uploading the attachment. As mentioned, computer 130 may be implemented via a cloud service that is accessed over the Internet, or may be a proprietary computer owned by the same enterprise that operates e-mail gateway computer 110, in which case communication link 162 may be a local area network or wide area network, instead of an Internet link.

It is possible to introduce a delay before the scans occur on the cloud server so that there is time for the pattern to be updated. Such a delay may be configured by an administrator or on the MTA gateway. In addition, if the user requests the attachment but no scans on the cloud server have been performed the cloud server may inform the user to wait until the scans are performed, i.e., there may be a delay of five to ten minutes (or more) while the scans are performed. Alternatively, the attachment may be downloaded upon user request. By default, the server informs the user to wait until the scans are performed, and the attachment is not downloaded until the scans are performed.

In step 324 computer 130 performs a dynamic scan of the attachment. As known in the art, this dynamic scan uses sandbox software, for example, to allow the attachment or any code within it to execute in a safe environment. Its behaviors are monitored and compared to a set of behavior rules that indicate whether or not the executing code is malicious. In between the time that the first dynamic scan was performed in step 212 and when this dynamic scan is performed in step 324 it is likely that the behavior rules are updated in order to include new behavior rules that will be able to detect any malicious software in the attachment that were not able to be detected back in step 212. The delay between these two scans is due to any artificial delay introduced by a configuration option in the e-mail gateway, the actual time delay between when the scan of step 212 and the scan of step 324 were performed, and any artificial delay (described above) introduced before the scan of step 324 is performed.

In addition, this dynamic scan on computer 130 is a longer scan than the scan performed in step 212. Typically, dynamic scans are either not performed on e-mail gateway computers or are of short duration (i.e., less than 5 seconds), while a dynamic scan on computer 130 may last 1 minute, 2 minutes, or more. A longer dynamic scan allows the executing attachment to exhibit more behaviors and provides the sandbox software more time to analyze these behaviors and compare them to the current behavior rules. Thus, it is possible that the scan of step 324 will determine that the attachment is malicious whereas the dynamic scan of step 212 did not.

Next, in step 328 computer 130 performs a static scan of the attachment. As known in the art, a static scan uses a virus pattern that includes any number of virus signatures that may match malicious code within the attachment. In between the time that the first static scan was performed in step 212 and when this next static scan is performed in step 328 it is likely that the virus pattern has been updated in order to include new virus signatures that will be able to detect any malicious software in the attachment that was not able to be detected back in step 212. The delay between these two scans is due to any artificial delay introduced by a configuration option in the e-mail gateway, the actual time delay between when the scan of step 212 and the scan of step 328 were performed, and any artificial delay (described above) introduced before the scan of step 328 is performed.

In addition, this static scan on computer 130 is a more comprehensive static scan then that performed in step 212. Typically, a static scan performed in an e-mail gateway may include only the most important virus signatures or virus pattern files, while a static scan performed on a cloud server computer can include all of the current virus pattern files. Thus, it is possible that the scan of step 328 will determine that the attachment is malicious whereas the static scan of step 212 did not.

Accordingly, step 332 determines whether or not the attachment is malicious based upon the scans in step 324 and 328. Returning now to step 312, the user has clicked upon link 440 in an attempt to download the attachment. As mentioned above, if the attachment has not been scanned yet, the user will be asked to wait until the attachment is scanned using an updated virus pattern. This is a configuration setting set by the enterprise and the default is to wait, rather than to download an attachment that has not been scanned yet on the server.

If the attachment had been determined to be not malicious in step 332 then in step 316 the attachment is downloaded to the user computer in order to be opened or saved. On the other hand, if the attachment is malicious, then in step 336 the attachment is not downloaded to the user computer and the user is alerted that the attachment is malicious.

FIG. 6 is an example of an alert message 510 delivered from the cloud server computer to the end user computer. In this example, the user is alerted that the attachment is malicious, but is given the option to download the attachment nonetheless. Alternatively, the message may simply alert the user that the attachment is malicious and not give him or her the option of downloading the attachment.

Computer System Embodiment

Figure 7A:
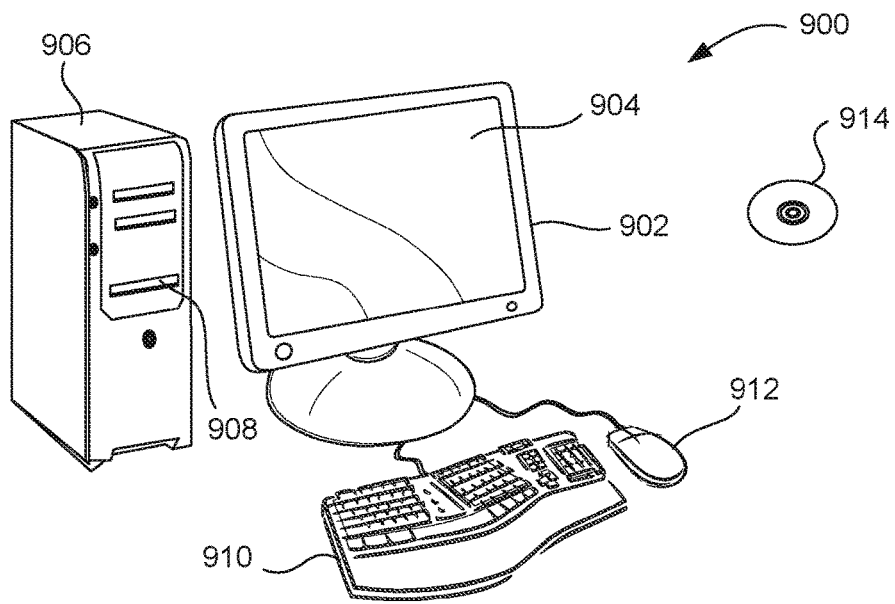
FIGS. 7A and 7B illustrate a computer system suitable for implementing embodiments of the present invention.
Figure 7B:
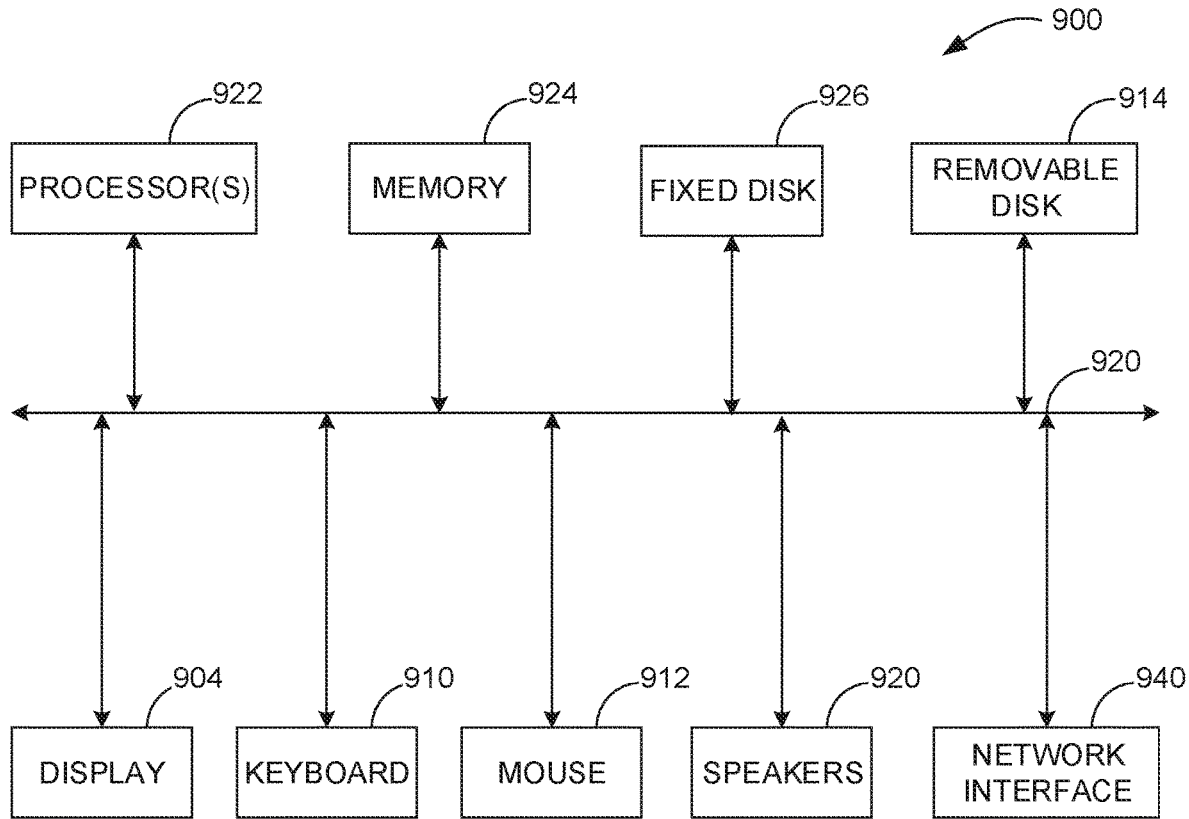

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of scanning an attachment to an e-mail message, said method comprising:
   scanning an attachment of an e-mail message at an e-mail gateway using a first virus pattern;
   replacing said attachment of said e-mail message with a URL that provides a link to said attachment on a server computer and delivering said e-mail message with said URL to an electronic inbox of the recipient of said e-mail message;
   sending said attachment from said e-mail gateway to said server computer;
   scanning said attachment at said server computer using a second virus pattern more recent than said first virus pattern that includes at least one virus signature not present in said first virus pattern; and
   alerting said recipient of said e-mail message that said attachment is malicious when said recipient selects said URL in said e-mail message.

2. A method as recited in claim 1 further comprising:
   determining that said attachment is not malicious after said scanning using said first virus pattern; and
   determining that said attachment is malicious after said scanning at said server computer using said second virus pattern.

3. A method as recited in claim 1 further comprising:
   determining that said attachment is malicious after said scanning at said server computer using said second virus pattern; and
   downloading said attachment from said server computer to an end user computer of said recipient after said alerting of said recipient and after receiving a further request to download said attachment.

4. A method as recited in claim 1 further comprising:
   delaying said delivery of said e-mail message with said URL to said electronic inbox based upon a delay configuration of said e-mail gateway.

5. A method as recited in claim 1 further comprising:
   delaying said scanning of said attachment at said server computer based upon a delay configuration of said server computer.

6. A method as recited in claim 1 wherein said server computer is a cloud server computer or is a computer within an enterprise that also controls said e-mail gateway.

7. A method as recited in claim 1 wherein said e-mail gateway is on said server computer.

8. A method as recited in claim 1, further comprising:
adding said at least one virus signature to said second virus pattern after said scanning at said e-mail gateway.

9. A method as recited in claim 8 wherein said at least one virus signature being discovered after said scanning at said e-mail gateway.

10. A method as recited in claim 1, further comprising:
in response to said recipient selects said URL in said e-mail message, said server computer informing said recipient to wait until said scanning at said server computer is performed, wherein said scanning at said server computer not being performed until after said recipient selects said URL and wherein said alerting occurring after said scanning at said server computer has been performed.

11. A method of scanning an attachment to an e-mail message, said method comprising:
performing a dynamic scan of an attachment of an e-mail message at an e-mail gateway using a first set of behavior rules;
replacing said attachment of said e-mail message with a URL that provides a link to said attachment on a server computer and delivering said e-mail message with said URL to an electronic inbox of the recipient of said e-mail message;
sending said attachment from said e-mail gateway to said server computer;
performing a dynamic scan of said attachment at said server computer using a second set of behavior rules more recent than said first set of behavior rules that includes at least one behavior rule not present in said first set of behavior rules; and
alerting said recipient of said e-mail message that said attachment is malicious when said recipient selects said URL in said e-mail message.

12. A method as recited in claim 11 further comprising:
determining that said attachment is not malicious after said dynamic scan using said first set of behavior rules; and
determining that said attachment is malicious after said dynamic scan at said server computer using said second set of behavior rules.

13. A method as recited in claim 11 further comprising:
determining that said attachment is malicious after said dynamic scan at said server computer using said second set of behavior rules; and
downloading said attachment from said server computer to an end user computer of said recipient after said alerting of said recipient and after receiving a further request to download said attachment.

14. A method as recited in claim 11 further comprising:
delaying said delivery of said e-mail message with said URL to said electronic inbox based upon a delay configuration of said e-mail gateway.

15. A method as recited in claim 11 further comprising:
delaying said dynamic scan of said attachment at said server computer based upon a delay configuration of said server computer.

16. A method as recited in claim 11 wherein said server computer is a cloud server computer or is a computer within an enterprise that also controls said e-mail gateway.

17. A method as recited in claim 11 wherein said e-mail gateway is on said server computer.

18. A method as recited in claim 11, further comprising:
adding said at least one behavior rule to said second set of behavior rules after said dynamic scan at said e-mail gateway.

19. A method as recited in claim 18 wherein said at least one behavior rule being discovered after said dynamic scan at said e-mail gateway.

20. A method as recited in claim 11, further comprising:
in response to said recipient selects said URL in said e-mail message, said server computer informing said recipient to wait until said dynamic scan at said server computer is performed, wherein said dynamic scan at said server computer not being performed until after said recipient selects said URL and wherein said alerting occurring after said dynamic scan at said server computer has been performed.

21. A method of scanning an attachment to an e-mail message, said method comprising:
performing a first dynamic scan of an attachment of an e-mail message at an e-mail gateway using a set of behavior rules;
replacing said attachment of said e-mail message with a URL that provides a link to said attachment on a server computer and delivering said e-mail message with said URL to an electronic inbox of the recipient of said e-mail message;
sending said attachment from said e-mail gateway to said server computer;
performing a second dynamic scan of said attachment at said server computer using said set of behavior rules that lasts longer than said first dynamic scan on said e-mail gateway; and
alerting said recipient of said e-mail message that said attachment is malicious when said recipient selects said URL in said e-mail message.

22. A method as recited in claim 21 further comprising:
determining that said attachment is not malicious after said first dynamic scan; and
determining that said attachment is malicious after said second dynamic scan at said server computer.

23. A method as recited in claim 21 further comprising:
determining that said attachment is malicious after said second dynamic scan at said server computer; and
downloading said attachment from said server computer to an end user computer of said recipient after said alerting of said recipient and after receiving a further request to download said attachment.

24. A method as recited in claim 21 further comprising:
delaying said delivery of said e-mail message with said URL to said electronic inbox based upon a delay configuration of said e-mail gateway.

25. A method as recited in claim 21 wherein said server computer is a cloud server computer or is a computer within an enterprise that also controls said e-mail gateway.

26. A method as recited in claim 21 wherein said e-mail gateway is on said server computer.

* * * * *